United States Patent [19]

Simmons

[11] 3,737,826

[45] June 5, 1973

[54] OVEN TEMPERATURE CONTROL SYSTEM AND THERMOSTATIC COMPONENT THEREOF

[75] Inventor: Russell T. Simmons, Morrison, Ill.

[73] Assignee: General Electric Company, Fort Wayne, Ind.

[22] Filed: Sept. 21, 1971

[21] Appl. No.: 182,453

[52] U.S. Cl.................................337/395, 337/140
[51] Int. Cl...............................................H01h 37/50
[58] Field of Search.........................200/1 TK, 5 C; 337/44, 123, 126, 131, 140, 340, 374, 375, 395

[56] References Cited

UNITED STATES PATENTS

| 2,714,799 | 8/1955 | Skrobisch | 337/140 X |
| 1,783,474 | 12/1930 | Hotchkiss | 337/123 X |
| 2,190,276 | 2/1940 | Smith | 337/375 |
| 2,897,320 | 7/1959 | Patti | 337/375 |
| 2,806,907 | 9/1957 | Mazzola | 200/5 C UX |
| 3,176,099 | 3/1965 | Bergsma | 337/126 |
| 2,896,163 | 7/1959 | Baker | 337/140 X |
| 388,505 | 8/1888 | Petit et al. | 337/395 |
| 1,967,359 | 7/1934 | Hamel | 337/135 |
| 2,166,498 | 7/1939 | Lacey | 290/38 |

Primary Examiner—Harold Broome
Attorney—Joseph B. Forman, John M. Stoudt, Robert B. Kennedy et al.

[57] ABSTRACT

A thermostat is described for sensing the temperature of a gaseous medium such as air and for actuating an electrical switch when the temperature reaches a predetermined value. The thermostat employs a thermally expandable wire mechanically coupled to a switch actuating plunger.

22 Claims, 9 Drawing Figures

Patented June 5, 1973

INVENTOR.
Russell T. Simmons,
BY Robert B. Kennedy
ATTORNEY.

Patented June 5, 1973 3,737,826

INVENTOR.
Russell T. Simmons,
BY Robert B Kennedy
ATTORNEY.

Patented June 5, 1973 3,737,826

INVENTOR:
Russell T. Simmons,
BY Robert B. Kennedy
ATTORNEY.

OVEN TEMPERATURE CONTROL SYSTEM AND THERMOSTATIC COMPONENT THEREOF

BACKGROUND OF THE INVENTION

This invention refers to oven temperature control systems and to thermostats for use therein.

Heretofore, ovens have typically been temperature controlled through the use of one of three types of thermostats. One of these types has employed an electrically conductive wire housed within an oven chamber whose resistance changes substantially with changes in wire temperature. The variable resistant wire is coupled through a heating element to a source of electric current. As the temperature of the wire increases, the resistivity of the wire itself changes. The increased voltage drop across the wire produces a decrease in the voltage drop across the heating element which element is of fixed resistance. The heater is in thermal contact with one leg of a U-shaped, bimetal switch. A second heater in an independent circuit is in thermal contact with the other switch leg. The relative temperature of the two legs determines the positions thereof relative to one another and thus the relative position of the bimetal switch contacts.

Another type oven thermostat in use today employs a Bourdon tube which is resilient and filled with helium. At room temperature the tube has a slight arcuate shape but upon being heated the degree of curvature diminishes as the helium seeks to expand and the tube seeks to maximize its internal volume to accommodate an increased volume. Straightening of the Bourdon activates a relay in suspending energization of the oven heating element.

The third thermostat in prevalent use in controlling oven temperature is a differential rod and tube device. Here, one end of a quartz rod is secured within a stainless steel tube. Heating of the assembly causes the tube to expand more rapidly than the quartz rod causing switch contacts on the unsecured rod end and tube to separate and thereby deenergizes the oven heating element. The principle problem associated with each of the foregoing thermostatic devices has been that of expense arising from either the complexity of the device or from the materials utilized. This is a principal problem to which the present invention is directed.

Accordingly, it is a principal object of present invention to provide an improved thermostat for use in controlling temperatures of ovens and the like.

SUMMARY OF THE INVENTION

In carrying out the above and other objects of the invention in one form a thermostat is provided for sensing the temperature of a gaseous medium and for actuating an electrical switch when the sensed temperature reaches a predetermined value. The thermostat comprises a frame, first and second spaced terminals adapted to be connected to a source of electrical current, and an actuating plunger mounted for movement along a first predetermined path with respect to the frame. A spring biases the actuating plunger in a first direction along the first predetermined path. A thermally expandable wire counterbiases the actuating plunger in a second direction along the first predetermined path with the second direction being substantially opposite the first direction. A first resilient arm is mounted to the frame for reciprocal movement along a second predetermined path with respect to the frame in response to movement of the actuating plunger along the first predetermined path. A first switch contact is electrically coupled to the first terminal and second switch contact is mounted to the resilient arm and electrically coupled to the second terminal whereby the first and second switch contacts may be opened and closed in response to movement of the actuating plunger along the first predetermined path as the temperature of the thermally expandable wire changes.

The above mentioned and other features and objects of this invention, as well as the manner of obtaining them, will become more apparent and the invention itself will be better understood by reference to the following description, taken in conjunction with the accompanying drawings, wherein:

DESCRIPTION OF THE PREFERRED EMBODIMENT

Figure 3:
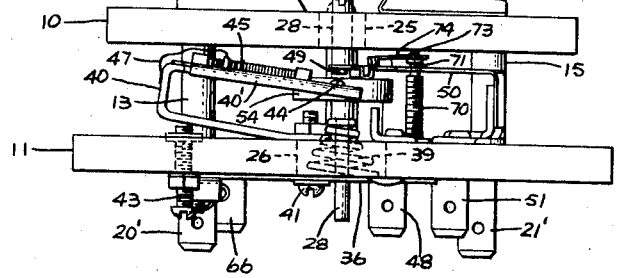
FIG. 3 is a front view in elevation of the thermostat shown in FIG. 1 dismounted from the oven.
Figure 4:
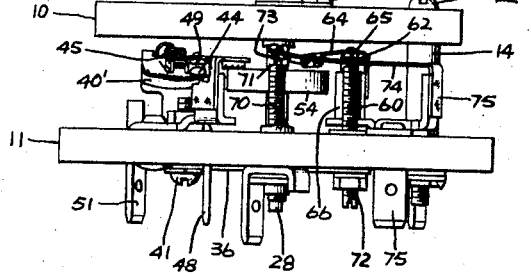
FIG. 4 is a side view in elevation of the thermostat shown in FIG. 3.
Figure 5:
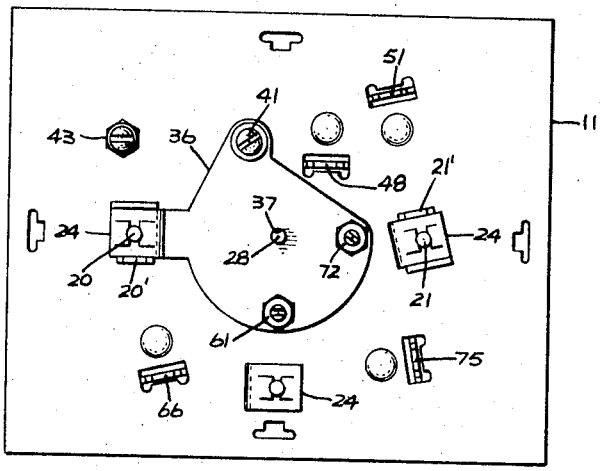
FIG. 5 is a plan view of the bottom of the thermostat shown in FIG. 3.

Referring now in more detail to the drawing there is shown in FIGS. 3 and 4 a thermostat embodying the present invention in one preferred form and comprising an upper frame member 10 and a lower frame member 11 spaced from the upper frame member in parallel relation therewith by three hollow cylindrical spacers 13, 14 and 15. The two frame members are in the shape of rectangular slabs with upper frame member 10 being slightly smaller in rectilinear dimensions than lower frame member 11. Each member is made from a ceramic material such as steatite, although other suitable materials could be used. Two ceramic posts 18 and 19 are mounted atop upper frame member 10 in spaced relation with one another. Each post has an aperture therethrough which is axially aligned with a corresponding aperture in frame members 10 and 11 during mounting. Mounting screws 20 and 21 are inserted through the apertures in the two frame members and through the two posts and hollow spacers 13 and 15. A third mounting screw 22 is likewise inserted through aligned apertures in the two frame members and hollow spacer 14. Three U-shaped spring nuts 24 grip the ends of mounting screws 20, 21 and 22 projecting through the bottom of lower frame member 11 as seen in FIG. 5 thereby securing the two frame members and the two posts rigidly together. Terminals 20' and 21', which are electrically connected to mounting screws 20 and 21 respectively, project downwardly from lower frame member 11 where they are relatively accessible for coupling to external power.

The centers of frame members 10 and 11 define axially aligned apertures 25 and 26, respectively, through which metallic actuating plunger 28 passes. To the top portion of the actuating plunger which projects above upper frame member 10 between posts 18 and 19 is mounted a ceramic wire spreader 30. A conductive, thermally expandable wire 31 such as Nichrome wire is wound tautly about posts 18 and 19 and wire spreader 30. One end of the wire is wrapped about the head of mounting screw 20 and secured to wire tab 33. The other end of the wire is secured to tab portion 34' of wire clip 34, a portion of which is sandwiched between post 19 and upper frame member 10. In this manner wire 31 is electrically connected across terminals 20' and 21'.

As seen in the drawing wire 31, which in one example may be 5.6 mils in diameter, is wound a number of times about the two posts and wire spreader assembly in forming several wire winding turns. Each contact point of the wire with the ceramic posts and spreader is within a notch in the surface thereof. These substantially parallel notches in which wire 31 is seated may aid in maintaining the substantially parallel, mutual alignment of the wire turns and may also aid in preventing slippage of the wire over the ceramic surfaces. The presence of these notches however is purely optional. With many wire winding machines it is preferable to wind wire 31 about smooth posts and spreader surfaces after which the wire contact points may be cemented. With this configuration and assemblage wire 31, which is disposed substantially normal to actuating plunger 28, tends to maintain spreader 30 in a position between posts 18 and 19 where each segment of wire 31 spanning the posts is straight. With wire 31 taut any deviation from a linear disposition of the spanning wire biases spreader 30 in a direction substantially normal to the wire.

To the bottom of lower frame 11 is secured an electrically conductive jumper plate 36 having an aperture 37 in axial alignment with apertures 25 and 26 in frame members 10 and 11, respectively. Through aperture 37 projects the lower extremity of plunger 28. A conical spring 39 resides within aperture 26 about actuating plunger 28. The lower end of spring 39 is in pressure contact with jumper plate 36 while the upper end of the spring is in pressure contact with a radial step in the actuating plunger. When in compression, spring 39 applies a force to actuating plunger 28 tending to move it upwardly as seen in FIGS. 3 and 4. As previously explained however upward movement of the plunger is restrained by the multiple turns of wire 31 wound about wire spreader 30. Properly mounted, equilibrium of the forces acting upon plunger 28 is reached with the plunger positioned between posts 18 and 19 so as to place a slight bend in the spanning portions of wire 31 between the posts as shown in FIG. 3.

To lower frame member 11 beneath upper frame member 10 is mounted oven temperature selector means comprising a U-shaped power element 40 by means of screw 41 which screw provides electrical connection between the power element and jumper plate 36. To one end of pendant portion 40' of the power element is secured switch contact 44. A portion of pendant portion 40' intermediate the ends thereof is divided into three lateral legs to the middle leg of which is secured an electrical heater element 45. One end of this heater element is electrically connected to the metallic power element by wire 47 while the other end thereof is electrically connected to terminal 48 by a conductive wire which, for clarity, is not shown. By elevating the temperature of the middle leg above that of the two outer legs pendant portion 40' is buckled thereby forcing switch contact 44 upwardly towards upper frame member 10. Screw 43 provides auxiliary means for manually calibrating the element.

Figure 7:
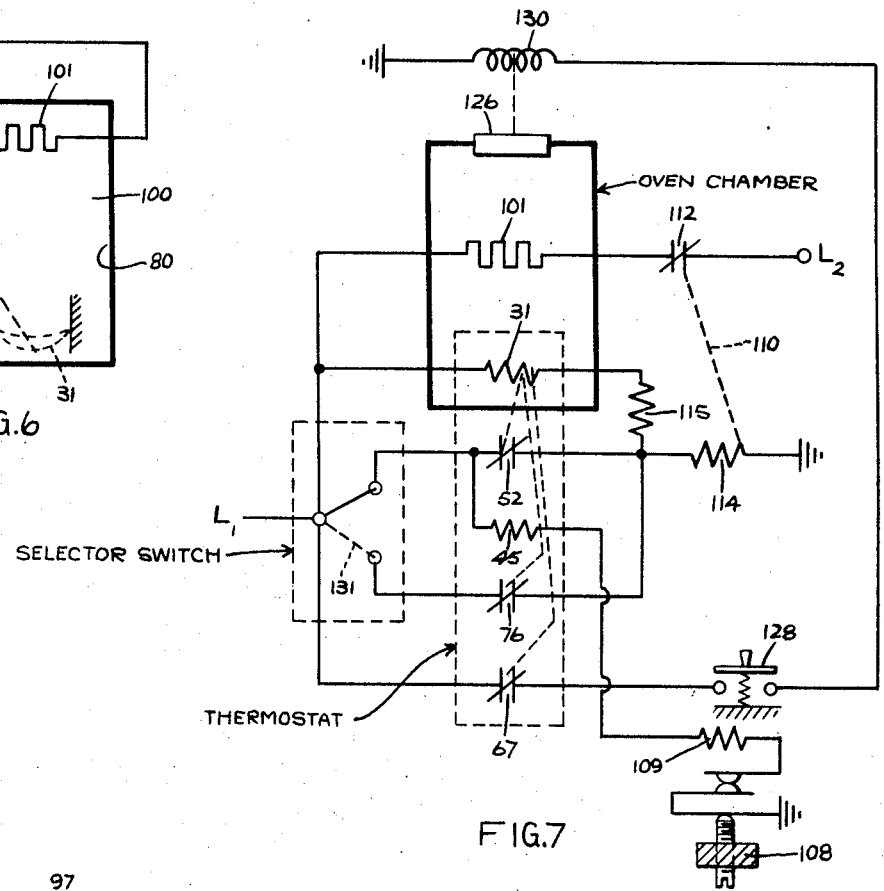
FIG. 7 is a schematic diagram in more detail of the system shown in FIG. 6.

Contact 49 is adapted to mate with contact 44 by being mounted on the distal end of electrically conductive, resilient arm 50 which arm is in turn mounted to lower frame member 11 and electrically connected to terminal 51. Contacts 49 and 44, which together form switch 52 as schematically shown in FIG. 7, are normally closed when wire 31 is at unelevated temperatures. Resilient arm 50 is mounted above centrally apertured ceramic ring 54 which ring is secured to actuating plunger 28 and may be considered as actually constituting a component part of the plunger itself. As contact 49 is mounted to the free end of resilient arm 50 it may be moved upwardly towards upper frame member 10 by ring 54 should plunger 28 itself move upwardly.

In operation, as the temperature of wire 31 is elevated the wire will elongate due to thermal expansion. With such elongation the counterbiasing force of the wire exerted on wire spreader 30 and actuating plunger 28 against the force of spring 39 exerted thereon diminishes permitting slight upward movement of the spreader and plunger away from the spring until force equilibrium is again established. At a point dependent upon the temperature setting established by the position of a control knob and by the current flow through heater 45, contacts 44 and 49 will be separated by elongation of wire 31 thereby opening switch 52. The opening of switch 52 in turn terminates oven heating as will be subsequently explained in more detail.

With continued reference to FIG. 4 an adjust screw 60 is shown mounted to lower frame member 11 by means of nut 61 in electrical connection with jumper plate 36. Switch contact 62 is mounted atop adjust screw 60. A resilient arm 64 having switch contact 65 secured to an end thereof is mounted to lower frame member 11 and electrically connected to terminal 66, a portion of which terminal projects through the lower frame member. Switch contacts 62 and 65 together form switch 67 as seen in FIG. 7. It should be noted that contact 62, which is immobile with respect to frame members 10 and 11, is disposed above contacts 44 and 49 nearer upper frame member 10 with resilient arm 64 between ring 54 and the upper frame member. This disposition provides for the separation of switch contacts 62 and 65 only after switch contacts 44 and 49 have already been opened by upward movement of ring 54 and actuating plunger 28 secured thereto. Thus, switch contacts 62 and 65 will not open with this disposition with respect to switch contacts 44 and 49 until wire 31 has been elevated to a temperature above that which caused switch contacts 44 and 49 to open. This relative disposition could, of course, be reversed if desired.

With continued reference to FIGS. 3 and 4, an adjust screw 70 having a switch contact 71 mounted atop thereof is also seen to be rigidly mounted to lower frame members 11 by screw 72. Switch contact 73 is mounted to a free end of resilient arm 74, which arm in turn is mounted to terminal 75, a portion of which terminal extends through lower frame member 11. Switch contacts 71 and 73, which together form switch 76 shown in FIG. 7, are disposed above switch contacts 62 and 65 closer to upper frame member 10 whereby they do not open until both switch contacts 44 and 49, as well as switch contacts 62 and 65, have been opened through elongation of wire 31 as previously explained.

Figure 1:
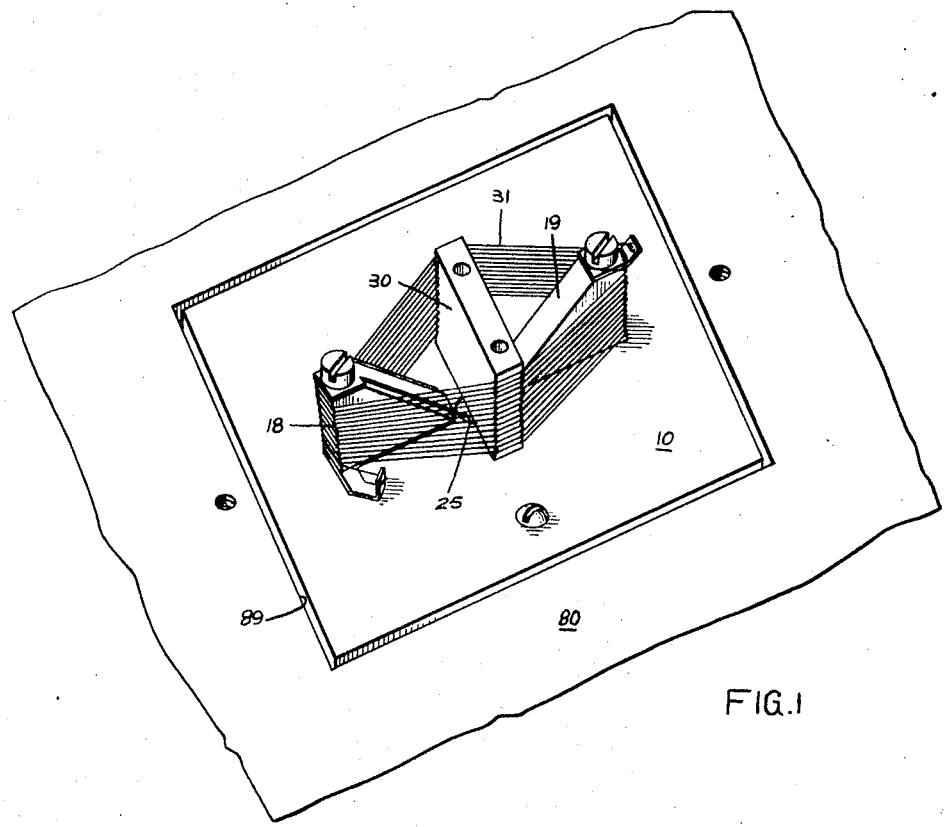
FIG. 1 is a perspective view of a portion of the interior surface of an oven wall having mounted thereto a thermostat embodying the invention in one form.
Figure 2:
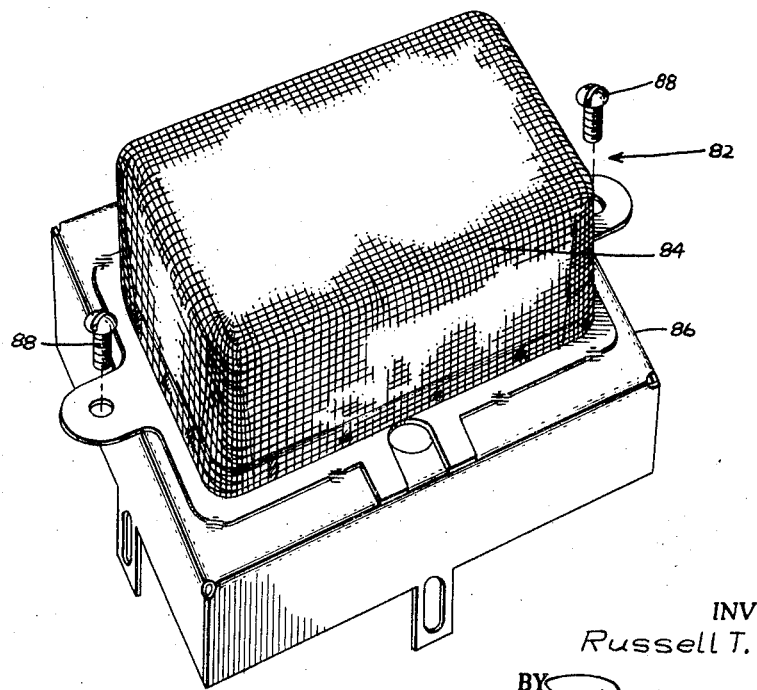
FIG. 2 is a perspective view of a shield adapted to be secured to an oven wall over that portion of the thermostat illustrated in FIG. 1 projecting into the oven chamber.

Referring now to FIGS. 1 and 2, the thermostat just described in detail is shown mounted in an oven with the upper surface of upper frame member 10 disposed substantially flush with interior oven wall 80. So mounted, posts 18 and 19, wire spreader 30, and thermally expandable wire 31 project into the oven chamber itself in contact with the air or other gaseous medium located therewithin. The thermostat components disposed beneath the upper frame member are thus not disposed within the oven chamber and consequently are not exposed to the heated air therewithin. About the thermostat components disposed within the oven chamber is secured shield 82. The shield comprises a cup-shaped wire mesh screen 84 secured to a substantially imperforate base 86 which base in turn is secured to oven wall 80 by screws 88 with a portion thereof projecting through opening 89 between oven wall 80 and frame member 10. Shield 82 provides protection to the thermostat by inhibiting manual touching of wire 31 and its mounting assembly as well as inhibiting the accumulation of grease and the like thereon. The shield is, of course, optional as well as the particular mounting arrangement just described.

Figure 8:
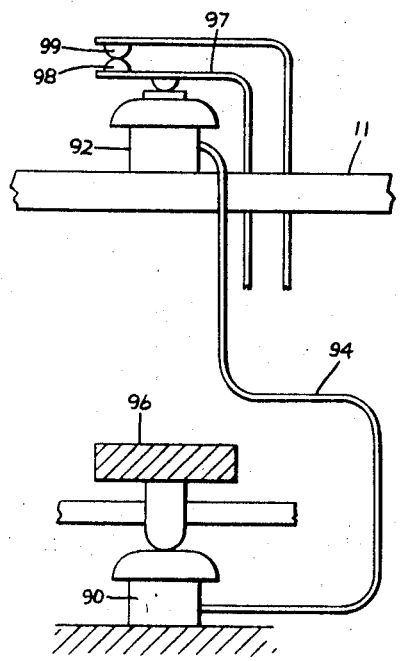
FIG. 8 is a schematic diagram of alternative means for manually selecting an oven temperature which may be substituted for the means shown in FIG. 3 as a component of the thermostat therein illustrated.

In FIG. 8 alternative means are illustrated for manually selecting operative oven temperatures which may be substituted for power element 40. This alternative means comprises two diaphragms 90 and 92 in internal fluid communication with one another by means of connecting tube 94 which system is filled with a suitable hydraulic fluid. Selector screw 96 is mounted in contact with diaphragms 90 whereby manual turning of the screw depresses the diaphragm. When diaphragm 90 is so depressed diaphragm 92 is forced upwardly against resilient arm 97 thereby pressing switch contact 98 upwardly against mating switch contact 99, which two contacts form switch 52 shown in FIG. 7. This results in ring 54, which ring is secured to actuating plunger 28, having to be moved a greater distance upwardly towards upper frame member 10 before separation of contacts 98 and 99 occur to signal termination of oven heating.

Figure 6:
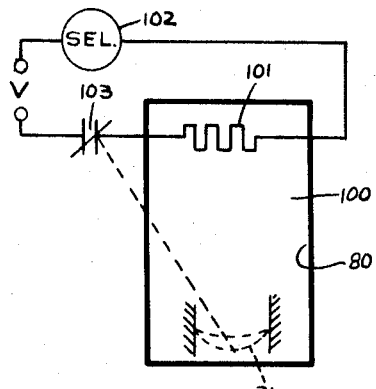
FIG. 6 is a schematic diagram of a system, useful in controlling the temperature of air in an oven which system may, if desired, utilize a thermostat of the type shown in FIG. 3.

FIG. 6 illustrates a system for controlling the temperature of air in an electrically heated oven which system may, if desired, utilize the just described thermostat. Thermally expandable wire 31 is here seen to be mounted within chamber 100 bounded by interior oven walls 80. An electrical heating element 101 is also mounted within the oven chamber. When selector switch 102 is positioned to an elevated oven temperature heater element 101 is energized by closure of switch 103 placing the heater element across voltage V. As heating element 101 heats the gaseous medium within chamber 100 adjacent the heating element also becomes heated by thermal conduction. As this occurs, that portion of the gaseous medium about wire 31 becomes also heated by thermal convection which in turn causes the temperature of wire 31 to become elevated by thermal conduction. As wire 31 is heated it expands. At a preselected temperature expansion of wire 31 through thermal-to-mechanical means indicated by the dashed line causes switch 103 to open thereby terminating the energization of heater element 101. With de-energization of heater 101 the gaseous medium in chamber 100 cools causing wire 31 to contract which in turn causes switch 103 to close. In this manner the temperature of the air in chamber 100 is controlled.

In FIG. 7 the system just described is shown in greater detail with additional system and circuit features which system may utilize the multiple switches of the thermostat shown in FIGS. 3 and 4. The thermostat is seen to be mounted to the oven with thermally expandable wire 31 positioned within the oven chamber and with thermostat switches 52, 67 and 76 positioned therewithout. The thermostat is electrically connected to voltage lines $L_1$ and $L_2$, each of which are preferably 110 VAC above ground and 220 VAC mutually across. System on/off switches are not shown for clarity. This system is adapted for 150° to 550°F oven operating temperatures, for a 600°F oven door safety interlock mechanism, and for a 900°F oven heat clean operation. These are conventional temperature ranges for present day oven operations. Other temperature ranges could, of course, be selected if desired.

In system operation, voltage lines $L_1$ and $L_2$ are energized and an oven operating temperature is manually selected by movement of selector knob 108 with the selector switch in the position illustrated. This action causes pendant portion 40' of power element 40 to buckle as heater 45 rapidly warms simultaneously with the warming of heater element 109 of a matching three legged power element in series connection with heater 45 and in mechanical coupling relation with knob 108. Relay switch 112 of relay 110 is closed by the rapid heating of relay resistor 114 thereby placing oven heating element 101 across $L_1$ and $L_2$. As the air temperature within the oven chamber rises wire 31 expands thereby permitting actuating plunger 28 to move upwardly as viewed in FIG. 3. Continued upward movement of actuating plunger 28 causes ring 54 to contact and force upwardly resilient arm 50. Power element 40 follows this upward movement until its stable position is reached as determined in part by the current flowing through heater 45. Continued movement of resilient arm 50 causes switch contact 49 to separate from switch contact 44 to open switch 52. This is the relative position of the contacts actually shown in FIG. 3.

Figure 9:
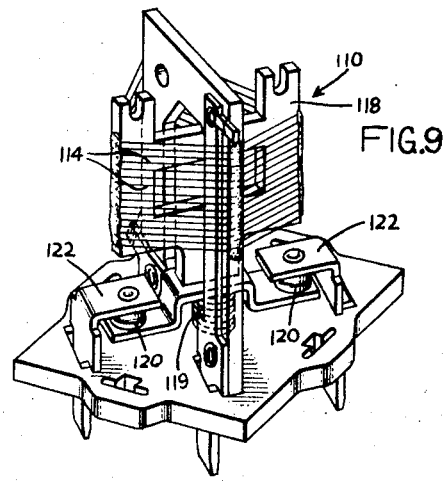
FIG. 9 is a perspective view of the relay schematically shown in FIG. 7 as a component of the system therein illustrated.

With the opening of switch 52, wire 31 and current limiting resistor 115 connected thereto are no longer shorted out by switch 52. Instead, they are placed in series circuit with relay wire 114 across $L_1$ and ground. This in turn produces a reduction in the current flow in relay wire 114 of relay 110 causing it to cool. As may be seen by reference to FIG. 9, cooling of wire 114 causes it to contract and force movable wire mounting support 118 downwardly against spring 119 forcing relay switch contacts 120 attached to support 118 also downward away from relay switch contacts mounted beneath rigid arm 122. These contacts form relay switch element 112 shown in FIG. 7. The opening of switch 112 removes oven heater element 101 from across $L_1$ and $L_2$ thereby terminating current flow therethrough.

It should also be carefully noted that the opening of switch 52 causes current to flow through thermally expandable wire 31 itself, which current flow causes the wire to be elevated in temperature above the temperature of air thereabout. This differential in temperature, which is of course determined by the resistance value of wire 31 itself and that of current limiting resistor 115, provides an oven temperature range differential. With the elevation of the temperature of wire 31 above that of the air thereabout the temperature of the air must fall below that which initially caused switch 52 to open and terminate oven heat before the temperature of the wire has fallen sufficiently to reclose switch 52. The temperature differential between oven turn on and turn off is substantially that of the temperature differential of wire 31 above air thereabout.

The circuit and system shown in FIG. 7 also includes oven heat clean means plus a safety interlock system to prevent manual opening of oven door 126 when the oven is at a temperature of approximately 600°F. For the oven to function at heat clean temperatures push button switch 128 must be closed for until this is done solenoid 130 is mechanically positioned so as to prevent movement of an unshown lever from "cook" to "clean" position, which lever movement in turn locks oven door 126. With closure of push button switch 128 and thermostat switch 67 solenoid 130 is energized and moves a pin thereby permitting movement of the aforementioned lever to the "clean" position. With the selector switch positioned as shown by dashed line 131 to a "clean" position switch 52 is removed from the circuit. As a result the oven continues to heat beyond the upper cook temperature range limit of 550°F. At 600°F thermostat switch 67 opens as switch contacts 62 and 65 are separated by actuating plunger 28. Opening of switch 67 de-energizes solenoid 130 which in turn manually prevents oven door 126 from being opened as explained above. The oven continues to be heated until heat clean temperature is achieved at which point movement of thermostat actuating plunger 28 opens switch 76 causing current to flow through wire 31 which in turn actuates relay 110 causing switch 112 to open and de-energizing oven heating element 101. The oven will then cool until switch 76 is reclosed. The heat clean operation is performed with a temperature differential provided as in the case of normal oven cook operation.

While there has been described what at present is considered to be the preferred embodiment of the present invention, it will be obvious to those skilled in the art that various modifications may be made therein without departing from the true spirit and scope of the invention.

What I claim as new and desire to secure by Letters Patent of the United States is:

1. A thermostat for sensing the temperature of a gaseous medium and for actuating an electrical switch when the sensed temperature reaches a predetermined value, said thermostat comprising a frame, first and second spaced terminals adapted to be connected to a source of electric current, an actuating plunger mounted for substantially linear movement along a first predetermined path with respect to said frame, a spring biasing said actuating plunger in a first direction along said first predetermined path, a thermally expandable wire counterbiasing said actuating plunger in a second direction along said first predetermined path with said second direction being substantially opposite said first direction, a first resilient arm mounted to said frame for reciprocal movement into and out of engagement with said actuating plunger along a second predetermined path with respect to said frame in response to movement of said actuating plunger along a first portion of said first predetermined path, a first switch contact electrically coupled to said first terminal, and a second switch contact electrically coupled to said first terminal, and a second switch contact mounted to said resilient arm and electrically coupled to said second terminal whereby said first and second switch contacts may be opened and closed in response to movement of said actuating plunger along said first portion of said first predetermined path as the temperature of said thermally expandable wire changes.

2. A thermostat in accordance with claim 1 wherein said spring biases said actuating plunger towards said first resilient arm tending to separate said first and second switch contacts, and wherein said thermally expandable wire counterbiases said actuating plunger away from said first resilient arm tending to close said first and second switch contacts.

3. A thermostat in accordance with claim 1 comprising two spaced posts mounted to said frame about a portion of each of which said thermally expandable wire is tautly wound.

4. A thermostat in accordance with claim 3 comprising a wire spreader mounted to said actuating plunger between said two spaced posts over two spaced portions of which wire spreader said thermally expandable wire is tautly wound.

5. A thermostat in accordance with claim 1 wherein said thermally expandable wire is electrically conductive and is adapted to be electrically coupled to a source of electric current.

6. A thermostat in accordance with claim 1 comprising means for manually adjusting the position of said first contact along said second predetermined path.

7. A thermostat for sensing the temperature of a gaseous medium and for actuating an electric switch when the sensed temperature reaches a predetermined value, said thermostat comprising a frame, first and second spaced terminals adapted to be connected to a source of electric current, an actuating plunger mounted for movement along a first predetermined path with respect to said frame, a spring biasing said actuating plunger in a first direction along said first predetermined path, a thermally expandable wire counterbiasing said actuating plunger in a second direction along said first predetermined path with said second direction being substantially opposite said first direction, a first resilient arm mounted to said frame for reciprocal movement along a second predetermined path with respect to said frame in response to movement of said actuating plunger along a first portion of said first predetermined path, an electrically conductive pendant mounted to said frame and divided into three legs intermediate the ends thereof, a first switch contact mounted to the free end of the pendant and electrically coupled to said first terminal, a second switch contact mounted to said resilient arm and electrically coupled to said second terminal, and electrical means for heating at least one of said pendant legs so that the relative position of said pendant ends may be altered to adjust the position of said first switch contact relative to said second switch contact at which contact separation occurs, whereby said first and second switch contacts may be opened and closed in response to movement of said actuating plunger along said first portion of said first predetermined path as the temperature of said thermally expandable wire changes.

8. A thermostat in accordance with claim 1 wherein said first predetermined path and said second predetermined path are substantially parallel.

9. A thermostat in accordance with claim 1 comprising a second resilient arm mounted to said frame for reciprocal movement along a third predetermined path with respect to said frame substantially parallel said first predetermined path in response to movement of said actuating plunger along a second portion of said first predetermined path, a third switch contact mounted to said second resilient arm, and a fourth switch contact rigidly mounted to said frame adjacent said third switch contact.

10. A thermostat in accordance with claim 9 comprising a third resilient arm mounted to said frame for reciprocal movement along a fourth predetermined path with respect to said frame substantially parallel said third predetermined path in response to movement of said actuating plunger along a third portion of said first predetermined path, a fifth switch contact mounted to said third resilient arm, and a sixth switch contact rigidly mounted to said frame adjacent said fifth switch contact.

11. A thermostat for sensing the temperature of a gaseous medium and for actuating an electrical switch when the sensed temperature reaches a predetermined value, said thermostat comprising a frame; first and second spaced terminals adapted to be connected to a source of electric current; an actuating plunger mounted for movement along a first predetermined path with respect to said frame; a spring biasing said actuating plunger in a first direction along said first predetermined path; a thermally expandable wire counterbiasing said actuating plunger in a second direction along said first predetermined path with said second direction being substantially opposite said first direction; a first resilient arm mounted to said frame for reciprocal movement along a second predetermined path with respect to said frame in response to movement of said actuating plunger along a first portion of said first predetermined path; a first switch contact electrically coupled to said first terminal; a second switch contact mounted to said resilient arm and electrically coupled to said second terminal; hydraulic means for mechanically biasing said first switch contact against said second switch contact with said hydraulic means including two spaced diaphragms, means providing fluid communication between said two spaced diaphragms, and means for manually depressing one of said two spaced diaphragms; whereby said first and second switch contacts may be opened and closed in response to movement of said actuating plunger along said first portion of said first predetermined path as the temperature of said thermally expandable wire changes.

12. A thermostat for sensing the temperature of a gaseous medium and for actuating an electrical switch when the sensed temperature of said gaseous medium reaches a predetermined value, said thermostat comprising a frame; first and second spaced terminals mounted to said frame and adapted to be coupled to a source of electric current; an actuating plunger mounted for movement along a first predetermined path with respect to said frame; a spring biasing said actuating plunger in a first direction along said first predetermined path; two spaced posts mounted to said frame about opposite sides of said actuating plunger, respectively; a wire spreader mounted to said actuating plunger between said two spaced posts; a thermally expandable wire wound tautly about at least a portion of each of said two spaced posts and said wire spreader thereby mechanically coupled to said actuating plunger to counterbias said actuating plunger in a second direction along said first predetermined path substantially opposite said first direction; first and second switch contacts mounted to said frame and adapted to be opened and closed in response to movement of said actuating plunger along a first portion of said first predetermined path; means electrically coupling said first switch contact and said first terminal; and means electrically coupling said second switch contact and said second terminal.

13. A thermostat in accordance with claim 12 wherein the surface of each of said two posts and said wire spreader has a plurality of substantially parallel notches in which portions of said thermally expandable wire are seated.

14. A thermostat in accordance with claim 12 comprising a first resilient arm mounted to said frame for reciprocal movement along a second predetermined path with respect to said frame in response to movement of said actuating plunger along a first portion of said first predetermined path, and wherein said first switch contact is mounted on said first resilient arm.

15. A thermostat in accordance with claim 14 comprising means for manually mechanically biasing said second switch contact against said first switch contact along said second predetermined path.

16. A thermostat in accordance with claim 14 wherein said first predetermined path and said second predetermined path are substantially parallel.

17. A thermostat in accordance with claim 12 wherein said thermally expandable wire is electrically conductive and is adapted to be electrically coupled to a source of electric current.

18. A thermostat in accordance with claim 14 wherein said actuating plunger is mounted for substantially linear movement into and out of contact with said resilient arm.

19. A thermostat in accordance with claim 12 comprising a resilient arm mounted to said frame for reciprocal movement along a second predetermined path with respect to said frame substantially parallel said first predetermined path in response to movement of said actuating plunger along a second portion of said first predetermined path, a third switch control mounted to said resilient arm, and a fourth switch contact rigidly mounted to said frame adjacent said third switch contact.

20. A thermostat for sensing the temperature of a gaseous medium and for actuating an electrical switch when the sensed temperature of said gaseous medium reaches a predetermined value, said thermostat comprising a frame; first and second spaced terminals mounted to said frame and adapted to be coupled to a source of electric current; an actuating plunger mounted for movement along a first predetermined path with respect to said frame; a spring biasing said actuating plunger in a first direction along said first predetermined path; a thermally expandable wire tautly mounted to said frame substantially normally said first predetermined path and mechanically coupled to said actuating plunger to counterbias said actuating plunger in a second direction along said first predetermined path substantially opposite said first direction; a resilient arm mounted to said frame for reciprocal movement along a second predetermined path with respect to said frame in response to movement of said actuating plunger along a first portion of said first predetermined path; a first switch contact mounted on said resilient arm; a second switch contact mounted to said frame and adapted to be opened and closed with said first switch contact in response to movement of said actuating plunger along a first portion of said first predetermined path; means electrically coupling said first switch contact and said first terminal; means electrically coupling said second switch contact and said second terminal; and hydraulic means for mechanically biasing said second switch contact against said first switch contact along said second predetermined path with said hydraulic means including two spaced diaphragms and means providing fluid communication between said two spaced diaphragms and means for manually depressing one of said two spaced diaphragms.

21. A thermostat for sensing the temperature of a gaseous medium and for actuating an electrical switch when the sensed temperature of said gaseous medium reaches a predetermined value, said thermostat comprising a frame; first and second spaced terminals mounted to said frame and adapted to be coupled to a source of electric current; an actuating plunger mounted for movement along a first predetermined path with respect to said frame; a spring biasing said actuating plunger in a first direction along said first predetermined path; a thermally expandable wire tautly mounted to said frame substantially normally said first predetermined path and mechanically coupled to said actuating plunger to counterbias said actuating plunger in a second direction along said first predetermined path substantially opposite said first direction; a first resilient arm mounted to said frame for reciprocal movement along a second predetermined path with respect to said frame in response to movement of said actuating plunger along a first portion of said first predetermined path; an electrically conductive pendant mounted to said frame and divided into three legs intermediate the ends thereof; first switch contact mounted on said first resilient arm and a second switch contact mounted to the free end of the pendant whereby said first and second switch contacts are adapted to be opened and closed in response to movement of said actuating plunger along a first portion of said first predetermined path; means electrically coupling said first switch contact and said first terminal; means electrically coupling said second switch contact and said second terminal; and electrical means for heating at least one of said pendant legs whereby the relative position of said pendant ends may be altered thereby adjusting the position of said first switch contact relative to said second switch contact at which contact separation occurs.

22. A thermostat for sensing the temperature of a gaseous medium such as air confined within an oven chamber and for actuating an electrical switch when the sensed temperature of said air reaches a predetermined value, said thermostat comprising a frame, first and second spaced terminals adapted to be connected to a source of electric current, an actuating plunger mounted for movement along a predetermined path with respect to said frame, a spring biasing said actuating plunger in a first direction along said predetermined path, a wire mounting assembly including two posts mounted to said frame with said actuating plunger disposed therebetween and a wire spreader mounted to said actuating plunger between said two posts, a thermally expandable wire tautly encompassing said wire mounting assembly to counterbias said actuating plunger in a second direction along said predetermined path opposite said first direction, first and second switch contacts mounted to said frame, and means for opening and closing said first and second switch contacts in response to movement of said actuating plunger along said predetermined path.

* * * * *